United States Patent [19]
Tanaka et al.

[11] Patent Number: 6,008,468
[45] Date of Patent: Dec. 28, 1999

[54] METHOD AND APPARATUS FOR PRODUCING A THIN MESH UTILIZING A LASER AND MASK SYSTEM

[75] Inventors: Hirokazu Tanaka; Jirou Takeda; Kazuhito Nakamura, all of Kyoto, Japan

[73] Assignee: Omron Corporation, Kyoto, Japan

[21] Appl. No.: 08/953,419

[22] Filed: Oct. 17, 1997

Related U.S. Application Data

[63] Continuation of application No. 08/532,817, filed as application No. PCT/IB94/00078, Apr. 22, 1994.

[30] Foreign Application Priority Data

| Apr. 22, 1993 | [JP] | Japan | 5-120932 |
| Nov. 15, 1993 | [JP] | Japan | 5-309726 |

[51] Int. Cl.⁶ ............................................. B23K 26/06
[52] U.S. Cl. .......................... 219/121.71; 219/121.7; 219/121.73; 219/121.77
[58] Field of Search .................. 219/121.7, 121.71, 219/121.67, 121.72, 121.73, 121.75, 121.77, 121.82

[56] References Cited

U.S. PATENT DOCUMENTS

| 4,621,912 | 11/1986 | Meyer | 351/160 |
| 4,622,058 | 11/1986 | Leary-Renick et al. | 65/105 |
| 4,879,451 | 11/1989 | Gart | 219/121.69 |
| 4,894,115 | 1/1990 | Eichelberger et al. | 219/121.69 |
| 4,992,025 | 2/1991 | Stroud et al. | 416/97 R |
| 5,043,553 | 8/1991 | Corte et al. | 219/121.7 |
| 5,066,357 | 11/1991 | Smyth, Jr. et al. | 219/121.71 |
| 5,093,549 | 3/1992 | Iwai et al. | 219/121.82 |
| 5,183,598 | 2/1993 | Helle et al. | 219/121.72 |
| 5,213,876 | 5/1993 | Smyth, Jr. et al. | 219/121.71 |
| 5,223,693 | 6/1993 | Zumoto | 219/121.68 |
| 5,239,160 | 8/1993 | Sakura et al. | 219/121.82 |
| 5,309,273 | 5/1994 | Mori et al. | 219/121.68 |
| 5,367,143 | 11/1994 | White, Jr. | 219/121.77 |
| 5,378,137 | 1/1995 | Asakawa et al. | 425/174.4 |
| 5,382,773 | 1/1995 | Kurihara et al. | 219/121.7 |
| 5,389,954 | 2/1995 | Inaba et al. | 347/258 |
| 5,539,175 | 7/1996 | Smith et al. | 219/121.73 |

FOREIGN PATENT DOCUMENTS

| 0 365 195 | 4/1990 | European Pat. Off. . | |
| 0 432 992 A1 | 6/1991 | European Pat. Off. . | |
| 41 06 423 | 10/1991 | Germany . | |
| 63-36992 | 2/1988 | Japan | 219/121.73 |
| 1-266983 | 10/1989 | Japan . | |
| 3-226392 | 10/1991 | Japan | 219/121.75 |
| 4-009291 | 1/1992 | Japan . | |
| 4-187392 | 7/1992 | Japan . | |
| 1750900 | 7/1992 | Russian Federation | 219/121.7 |
| 93/15911 | 8/1993 | WIPO . | |

*Primary Examiner*—Geoffrey S. Evans
*Attorney, Agent, or Firm*—Foley & Lardner

[57] ABSTRACT

A laser and mask system is disclosed which can produce a variety of thin meshes, in different materials, without exchanging masks. One device includes a laser oscillator which emits an excimer laser beam through a mask to project a plurality of laser beams onto a thin material. A translator device moves the thin material and the laser beams relative to each other in order to simultaneously create through holes of a desired shape in the thin material. A storage device stores information relating to the desired shape and a control device reads the information from the storage device and provides control signals to the laser and the translator device in accordance with the information. Another device includes an optical system for varying a magnification and a focus of the laser beams in order to create the through holes in the thin material. In another device, the mask has through holes aligned in a sequential pattern along a line and a feeding device advances the thin material parallel to the line. In yet another device, the mask includes two submasks which are overlaid such that their respective openings overlap. An adjusting device varies the degree of overlap in order to create the desired mask pattern.

39 Claims, 15 Drawing Sheets

SIGNAL TO CONTROL INTENSITY OF BEAM

SIGNAL TO LASER OSCILLATOR TO BEGIN OSCILLATION

SIGNAL TO CONTROL
INTENSITY OF BEAM

SIGNAL TO OSCILLATOR
TO BEGIN OSCILLATION

FIG.19
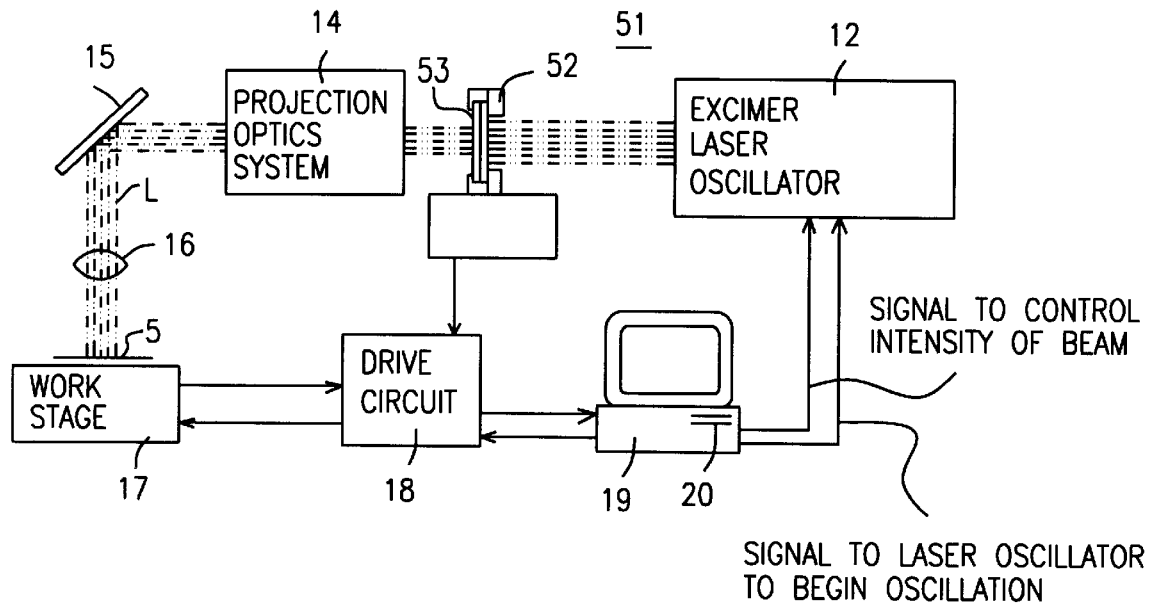
FIG.20
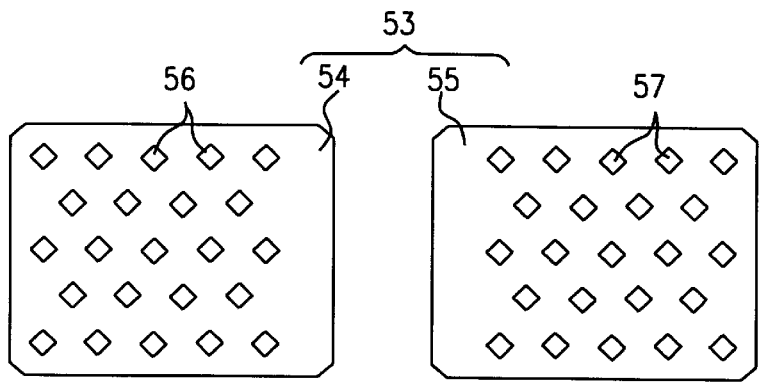
FIG.21a          FIG.21b          FIG.21c
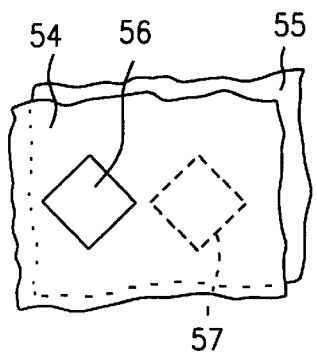 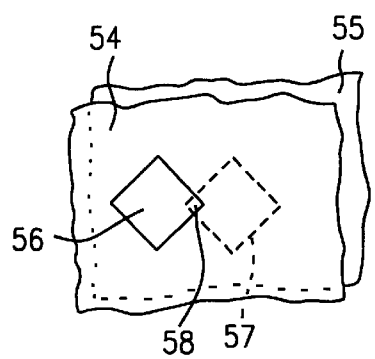 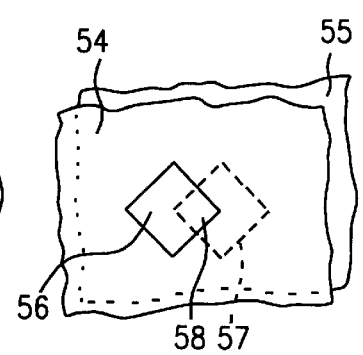

METHOD AND APPARATUS FOR PRODUCING A THIN MESH UTILIZING A LASER AND MASK SYSTEM

This application is a continuation of application Ser. No. 08/532,817, filed Jan. 18, 1996, now abandoned, which is the National Phase of PCT/IB94/00078, filed Apr. 22, 1994, now abandoned.

BACKGROUND OF THE INVENTION

1. Field of the Invention

This invention concerns a thin mesh and a method and device for producing that mesh. More specifically, it concerns a thin mesh produced by a high-density microscopic mesh process, a method for producing such a thin mesh using an ultraviolet beam, and a device for producing such a thin mesh.

2. Related Art

FIG. 26 is a simplified cross section of a common design for an inhaler (atomizer) 101, which creates a spray by means of ultrasonic vibration. Fixed to the upper portion of casing 104, inhaler 101 has a mesh 102 containing numerous microscopic holes 103, as pictured in FIG. 27. The upper surface of the mushroom-shaped vibrator 105 is pressed against the lower surface of mesh 102, and the bottom of vibrator 105 is immersed in liquid medicine 107, which is kept in reservoir 106. In the center of vibrator 105 and traversing its length is suction tube 108.

When vibrator 105 is made to vibrate up and down, mesh 102, pressed with an appropriate force by vibrator 105, resonates with the same microscopic vibration. When mesh 102 resonates, negative pressure is generated between the mesh and vibrator 105. This causes the liquid medicine 107 in tank 106 to be sucked through tube 108 to the upper surface of vibrator 105. The medicine 107 which is sucked to the region between mesh 102 and vibrator 105 passes through microscopic holes 103 when mesh 102 vibrates, and vaporized medicine 107 is sprayed into the air.

Because the mesh 102, which is used in the inhaler 101 described above, requires that medicine 107 be atomized (i.e., vaporized), the numerous holes 103 which constitute the mesh must be sufficiently minute, as shown in FIG. 27. For this reason, the material used for the mesh must be exceedingly tough and resistant to corrosion. In addition, because of the use to which it will be put, a medical device such as inhaler 101 must use a material which is resistant to chemicals and safe for humans.

Methods to produce a mesh 102 with microscopic holes 103 using a single process include electroforming, etching and the electron discharge method. However, if mesh 102 is to be produced by electroforming, only certain specific metals such as nickel can be used, resulting in poor anti-corrosive properties. (Gold and some other metals could also be used, however these are expensive.) Since heavy metals pose a safety risk for humans, a mesh 102 made from nickel could not be used in medical equipment, and its uses are limited. A mesh which is safe for human beings can be achieved by plating the surface of nickel mesh 102 with another metal. However, since it is impossible to completely eliminate the formation of pinholes in the metal plating, it is not possible to completely prevent leaching of the nickel.

When an inhaler 101 as described above is used, the effective delivery of the drug to the affected part varies with the diameter of the particles of spray. This diameter is profoundly influenced by the shape and the cross-sectional contour of the holes 103 in the mesh. Because the mesh 102 in an inhaler 100 as described above must resonate with vibrator 105, the thickness of the mesh is constrained by the frequency of vibrator 105.

When the mesh is produced by electroforming, there is a correlation between the thickness of the mesh material and the cross-sectional shape of holes 103. The shape of the holes is limited by the thickness of the mesh, and in fact the only possible form for holes 103 is the hemispheric cross sections shown in FIG. 28. Because it is difficult to process holes 103 along their depth to achieve a desired result, it is not possible to achieve the most desirable cross-sectional contour for holes 103.

With the electroforming method, both the arrangement of holes 103 and their shape must be regular, as shown in FIG. 27; an irregular arrangement of holes 103 is not a possible design.

When the mesh is formed by etching or by the electron discharge method, it is extremely difficult to vary the diameter of holes 103 along their depth. The holes produced by these methods are completely straight, as shown in FIG. 29. It is not possible to form holes in mesh 102 of any other desired cross-sectional shape. Holes 103 could not, for example, be made to taper significantly.

This invention is developed in view of the shortcomings of the examples of the prior art discussed above. Its objective is to provide a mesh and a production technology for that mesh which would not be limited as to materials, provided the materials are thin enough. This mesh would be able to use a material with superior anti-corrosive properties and chemical resistance, yet which would be safe for human beings. The shape of the holes in this mesh and their cross-sectional contour could be selected as needed.

SUMMARY OF THE INVENTION

The thin mesh of this invention is distinguished by the fact that it has numerous microscopic through holes of high aspect ratio which are formed in a thin material by projecting a beam of ultraviolet light onto it. Materials which can be used for the mesh include polymers, ceramics and metal films.

The method for producing a thin -mesh according to this invention is distinguished by the fact that it entails creating numerous microscopic through holes in a thin material by projecting a beam of ultraviolet light onto it.

In the production method described above, a number of ultraviolet beams, which are sufficiently small to produce holes of the desired shape, are projected simultaneously while the material being processed and the aforesaid beams are moved with respect to each other. In this way numerous through holes of the desired cross-sectional contour can be formed simultaneously.

The device for producing a thin mesh according to this invention is distinguished by the fact that it hae a device for producing beams of ultraviolet light, which are sufficiently small, to produce through holes of the desired shape, and a device to move the thin material which is being processed and the aforesaid ultraviolet beams with respect to each other.

The device for producing a thin mesh described above may be equipped with: a device to project beams of ultraviolet light, which are sufficiently small, to produce through holes of the desired shape; a device to store the shape into which the aforesaid through holes are to be formed; a device to move the thin material which is being processed and the aforesaid ultraviolet beams relative to each other; a device on the aforesaid moving device to detect the locations to be processed; a device to compare the signal from the aforesaid device to detect the locations to be processed with the shape into which the mesh is to be formed which is stored in the aforesaid storage device; and a device which, based on the comparison made by the above comparing device, controls the aforesaid moving device according to the shape to be formed and outputs to the aforesaid emitting device a signal causing it to oscillate the ultraviolet beams and a signal to control the intensity of those beams.

Another method to produce a thin mesh according to this invention is distinguished by the fact that a series of masks are used, each of which provides a pattern of holes which differ from those of the next pattern in shape or diameter. These patterns are applied sequentially to the same region of the thin material and each is irradiated with an ultraviolet beam in order to create in the thin material through holes with the desired cross-sectional shape.

Yet another device to produce a thin mesh according to this invention is distinguished by the fact that it is equipped with: a series of masks, each of which has a pattern of holes with the same pitch but which differ from those of the next mask in shape or diameter; a device to emit and focus simultaneously on the thin material the ultraviolet beams which pass through the pattern of holes in each of the aforesaid masks; and a device to move the thin material at a fixed pitch each time.

This device to produce a thin mesh may also have a device to cut the aforesaid thin material in which holes have been formed.

Yet another method to produce a thin mesh according to this invention is distinguished by the fact that it entails using beams of ultraviolet light to project onto a thin material the image of the pattern of holes in a mask and then varying the position of the thin material with respect to the plane on which the aforesaid image is focused, along a path which is parallel to the optical axis of the ultraviolet beams. In this way holes can be created in the thin material whose diameter varies with their depth.

Yet another device to produce a thin mesh according to this invention is distinguished by the fact that it contains a device to generate beams of ultraviolet light; masks with patterns of holes in them; an optical system which can project onto the thin material, which is to be processed, the image of each of the aforesaid patterns of holes and which is capable of varying its magnification; and a translating device to move the aforesaid thin material on a path which is parallel to the optical axis of the ultraviolet beams.

Yet another method to produce a thin mesh according to this invention is distinguished by the fact that it entails overlaying at least two submasks containing openings, matching up the aforesaid openings to create a pattern of holes, and varying slightly the overlap of the aforesaid holes so as to vary the dimensions of the holes in the aforesaid pattern. When beams of ultraviolet light are passed through the aforesaid pattern of holes, through holes are created in the thin material.

Yet another device to produce a thin mesh according to this invention is distinguished by the fact that it has a device to generate beams of ultraviolet light; a mask consisting of at least two overlaid submasks containing openings whose dimensions can be varied by varying slightly the way in which the aforesaid submasks overlap; a device to vary the amount of overlap of the aforesaid submasks; and an optical system to project onto the thin material, which is to be processed, beams of ultraviolet light which have passed through the aforesaid pattern of holes.

No specific limitation is placed on the material used to produce the thin mesh of this invention, provided that it is a thin material. Thin polymer materials, thin ceramics or anticorrosive and chemically resistant thin metal films can be used, resulting in a flexible mesh with superior resistance to corrosion and chemicals. A material composed of various substances can also be used. The most appropriate material can be selected for each application. If the mesh is to be used in medical equipment, for example, it can be made from a material such as polysulfone or polyester which is safe to humans and offers superior resistance to corrosion and chemicals. For equipment to be used for physics or chemistry, the mesh can be made from a material such as polyamide.

In the method for producing a thin mesh according to this invention, beams of ultraviolet light are projected onto a thin material to create microscopic through holes. This method allows a microscopic mesh to be produced from whatever material one selects. By controlling either the path over which the material is translated or the pattern over which the ultraviolet beams are scanned, we can create through holes of any desired shape and cross-sectional contour. In particular, the holes can be tapered either stepwise or smoothly.

If the holes are created by projecting beams of ultraviolet light of sufficiently small diameter with respect to the shape the holes are to attain, and the beams and the thin material are moved relative to each other, through holes of the desired shape can be created merely by scanning the beams, without having to rely on masks to shape the beams. This method eliminates the time required to change the mask. If a number of ultraviolet beams are used, a number of through holes can be formed at once, resulting in yet shorter processing time.

A signal representing a detected location which is output by the device for that purpose in the moving device which moves the thin material can be compared with the projected appearance which is recorded in the device where the shape of the through holes are stored, and the moving device which moves the thin material can be controlled in response to this. A signal to oscillate the beams and a signal to adjust their intensity according to the shape of hole being produced in the material can be output to the device which projects the ultraviolet light. If this method is employed, the manufacture of a thin mesh having the desired type of holes can be automated.

If various masks are used, each of which has a pattern of holes differing from those of other masks in shape or diameter, beams of ultraviolet light which are shaped by the different pattern of holes in each mask can be projected onto the thin material sequentially. In this way the shapes of the through holes can be varied along their depth. This method allows us to execute on the thin material a precisely controlled multi-stage microscopic mesh process which produces through holes of any desired cross-sectional contour. In particular, if a number of patterns of holes of different shapes or diameters are provided as a mask, each having the same pitch, a number of through holes can be processed simultaneously. This shortens the processing time and improves the ease with which the mesh can be produced. If a hoop or another long piece of material is used and the material is cut after the mesh process is completed, mass production of the mesh will be further enhanced.

If the focal plane of the ultraviolet beam and the thin material are varied with respect to each other along a path parallel to the optical axis of the beam, the degree to which the beam is defocused can be varied, and the area of the thin material onto which the beam is projected can be varied. If the distance from the focal plane to the thin material is varied continuously over time, the diameter of the holes can be varied continuously and smoothly along their depth. Tapered through holes whose inner surfaces vary smoothly can easily be produced. Use of this method will also result in a shorter processing time.

A mask can be formed by overlaying at least two submasks with a number of openings in them, and a pattern of holes can be created by overlapping the openings. Then by varying the amount of overlap of the aforesaid openings, we can change the dimensions of the holes in the pattern. When we change the amount of overlap of the submasks, we can change the size of the holes. With this method, then, we can vary the size of the holes in the pattern using only a single mask and without changing the mask or adjusting the optical system. In this way we can produce through holes of various dimensions. If we vary the size of the holes in the pattern while the through holes are being created, we cause the diameter of the through holes to vary. This method allows us to create, in a short time, through holes with the desired cross-sectional contour whose diameters vary along their depth either continuously or non-continuously.

BRIEF DESCRIPTION OF THE DRAWINGS

FIG. 7(a) shows a cross section of the desired hole; FIG. 7(b) shows a cross section of a similar mesh hole created by stepping the sides.

FIG. 19 shows the configuration of a device to produce a mesh which is another preferred embodiment of this invention.

FIG. 20 shows a front view of the submasks comprising the mask in the same device.

FIGS. 21(a), 21(b), and 21(c) show how the openings in that same mask vary.

DETAILED DESCRIPTION

Figure 1:
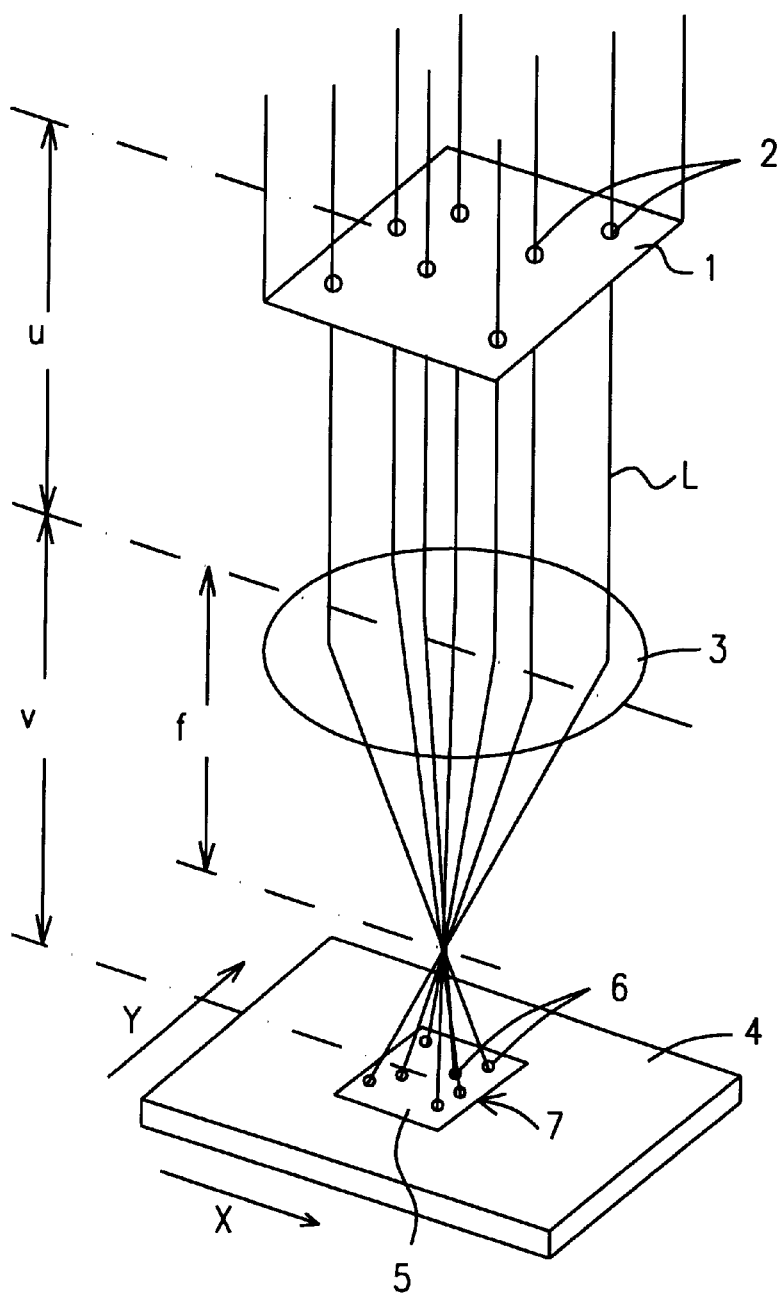
FIG. 1. uses an preferred embodiment of this invention to illustrate the basic principle which underlies this method to produce a mesh.

FIG. 1 uses an preferred embodiment of this invention to illustrate the basic principle which underlies this method to produce a mesh consisting of a thin material. Excimer laser beams L, which are emitted by an excimer laser oscillator, pass through microscopic openings 2 in mask 1 and are thereby forced to assume a specified shape. The beams are then focused by objective lens 3 and projected onto thin material (i.e., mesh material) 5, consisting of, for example, a polymer such as polysulfone, polyester, or polyamide, which is immobilized on work stage 4, an XY table or the like. The reduced image of the pattern of holes 2 in mask 1 is caused to appear or thin material 5. When the mesh process is carried out on material 5 to produce holes 6, whose arrangement is identical to that of pattern 2, mesh 7 is obtained. If f is the focal length of object lens 3, u is the distance from object lens 3 to mask 1, and v is the distance from object lens 3 to thin material 5 on work stage 4, then according to a well-known formula, the relationship of u, f and v must satisfy $$(1/u)+(1/v)=1/f$$

for the image of mask 1 to be produced on material 5. If M is the magnification (=1/magnification) of the image of pattern 2 which is produced on material 5, then M can be expressed in terms of the aforesaid u, v and f as $$M = u/v = (u/f) - 1$$

Consequently, if the magnification M is determined, the positions u and v of mask 1 and object lens 3 are determined by the focal length f of object lens 3. Thus it is possible to create holes 6, which are identical to those of pattern 2 in mask 1, at any desired magnification M.

A mask 1 with numerous holes comprising a pattern 2, as shown in FIG. 1, will create numerous holes 6 at a single time. However, it would also be possible to use a mask 1 with a single hole 2 and move thin material 5 by means of work stage 4. In this way single holes 6 could be created one by one to produce a mesh 7 containing numerous holes.

Figure 2A:
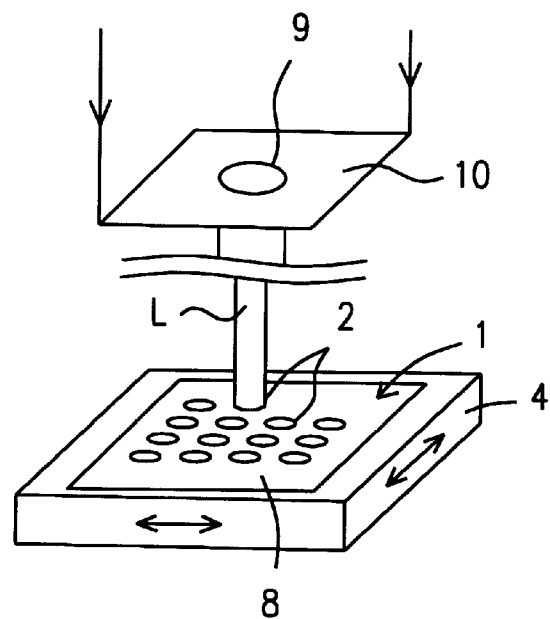
FIGS. 2(a) and 2(b) are perspective drawings showing a method to produce a thin mesh which is another preferred embodiment of this invention.
Figure 2B:
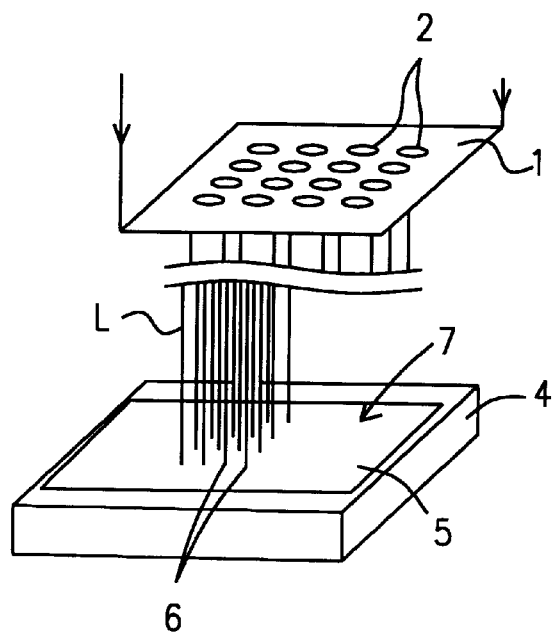

FIGS. 2 (a) and 2 (b) are partial elevation views illustrating another method for producing a thin mesh which is preferred embodiment of this invention. In this embodiment, as shown in FIG. 2 (a), metal foil 8 is affixed to the top of work stage 4. Master mask 10 has a single opening 9, which is created by etching or some similar process. Mask 10 shapes excimer laser beam L. Work stage 4 moves metal foil 8 while a pattern of holes 2 arranged in identical fashion to holes 6 in the previous mask 1 is created in metal foil 8 using excimer laser beam L. This produces a mask 1 consisting of a metal foil 8 with a pattern of holes 2, each of which is a reduced version of the aforesaid opening 9. Next, the mask 1 produced in this way is set on a mask stage, as shown in FIG. 2 (b), and a piece of thin material 5, which may be polyamide or some similar substance, is affixed to work stage 4. A number of excimer laser beams L, which have passed through and been shaped by mask 1, at once create the same number of holes 6 in material 5, producing the desired mesh 7. This method, then, allows us to manufacture a thin mesh 7 containing numerous holes 6 starting with master mask 1, which has only one relatively rough opening.

Figure 3:
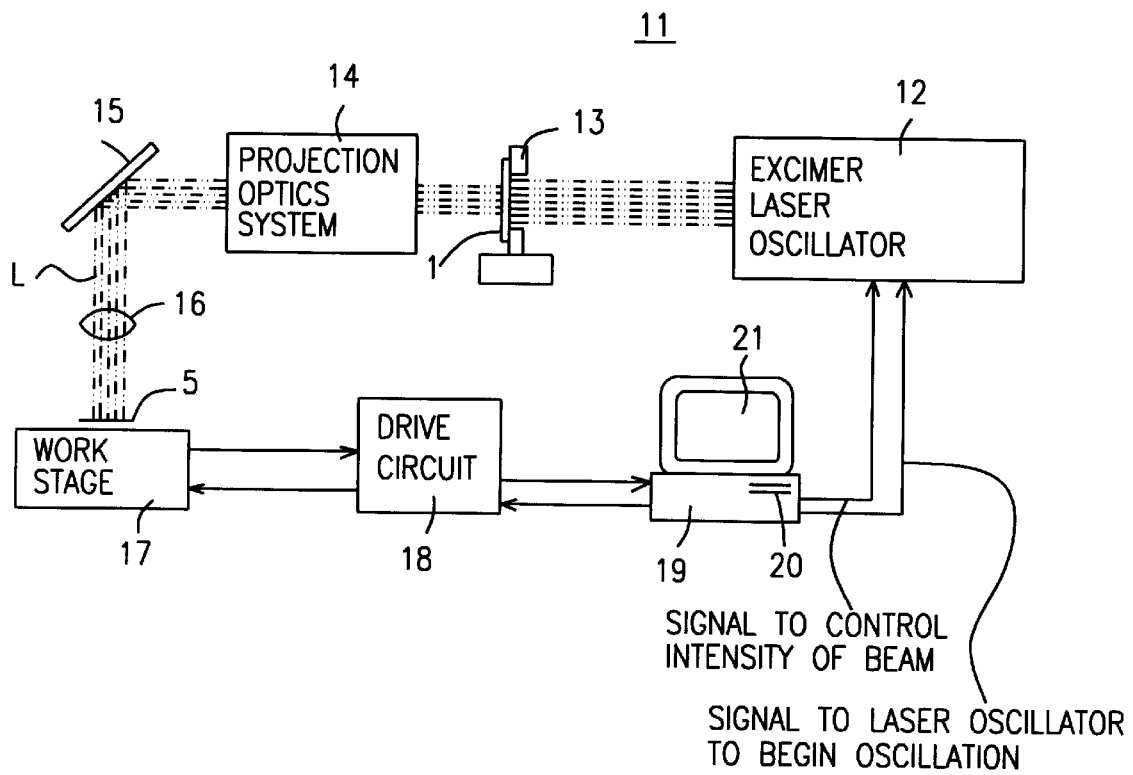
FIG. 3 is a rough drawing showing the configuration of a device to produce a thin mesh which is another preferred embodiment of this invention.

FIG. 3 illustrates the configuration of device 11, which produces a mesh according to this invention. In this figure, 12 is an excimer laser oscillator; 13 is a mask stage which supports mask 1 and adjusts its position; 14 is a projection optics system; 15 is a totally reflective mirror; and 16 is an objective which creates an image of pattern 2 on the surface of material 5. 17 is a work stage such as an X-Y or R-Θ stage to move material 5, which is loaded upon it, in two dimensions with respect to excimer laser beams L; 18 is a drive circuit which uses numerical values to control the speed, position, and so forth of work stage 17. Work stage 17 has an encoder or other device (not pictured) to detect the position of the work. 19 is a device (a computer) to control the driving of the work stage. It has a storage device 20, which may be a floppy or hard disk drive to store the desired appearance of the holes 6 one wishes to create. The computer compares the signal representing the detected position of the work which is output by the device for that purpose with the desired appearance stored in device 20 and evaluates how well they match. Based on this evaluation, it outputs to drive circuit 18 a signal representing the target position for work stage 17. It also outputs to laser oscillator 12 a signal to adjust the intensity of the laser beam and a signal to begin oscillation. 21 is a display.

The excimer laser beam L emitted by laser oscillator 12 is shaped into the desired beam pattern by mask 1 and passes through projection optics system 14. The beams are reflected by totally reflective mirror 15 and pass through objective 16 to strike material 5 on work stage 17. Before any of this takes place, mask stage 13 has adjusted the position of mask 1, and the focal length of optical system 14 has been adjusted. The size of holes 2 in mask 1 is adjusted by imaging them on the surface of material 5 at different magnifications M. Based on the desired appearance of holes 6 which is stored in device 20, control device 19 causes drive circuit 18 to move work stage 17 over a path which is previously programmed. At the same time, it synchronously controls the oscillation of laser oscillator 12 to produce the desired holes in material 5.

Figure 4:
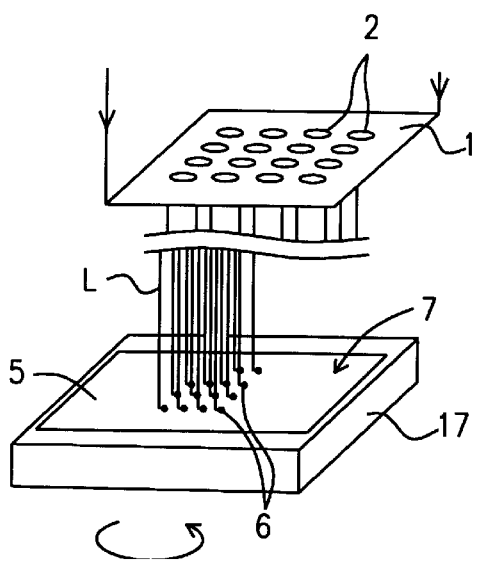
FIG. 4 is a perspective drawing illustrating the method to produce a thin mesh using the same device.

This type of device 11 can produce, for example, a mesh 7 like that shown in FIG. 4. In this method, just as in FIG. 2 (a), a mask 1 fashioned with the help of a master mask 10 is placed in mask stage 13, and material 5 is placed on work stage 17. When excimer laser beam L passes through mask 1, it is shaped into beams whose diameter is smaller than that of holes 6. Control device 19 causes work stage 17 to be moved continuously in a circular pattern according to the shape for holes 6 which is stored in device 20, and a number of holes 6 arranged in a desired pattern are produced at one time by excimer laser beams L, which are smaller in diameter than the holes they are creating. When this method is used, mask 1 need not be changed each time the shape of holes 6 needs to be modified. A pattern of holes 6 of any desired shape can be created simply by recording in device 20 the shape the holes are to be given and the path over which work stage 17 is to be moved.

Figure 5:
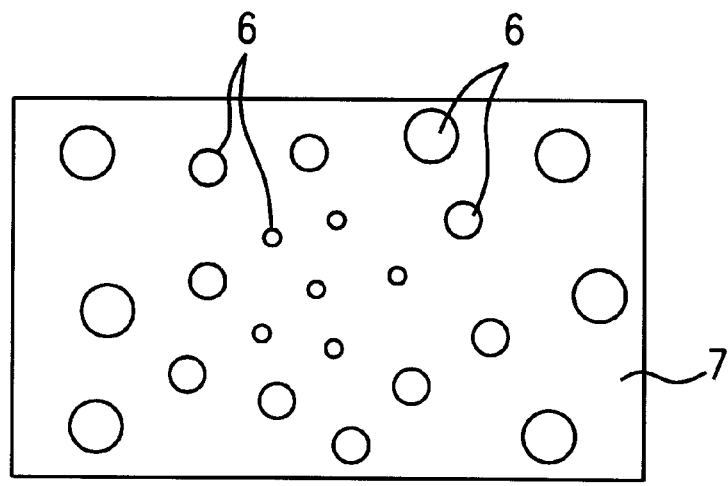
FIG. 5 is a plan view of a mesh produced by the same device.
Figure 6:
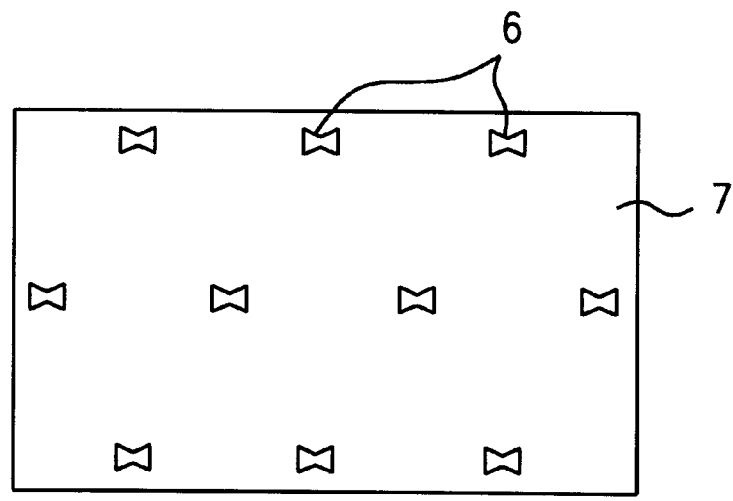
FIG. 6 is a plan view of another mesh produced by the same device.
Figure 26:
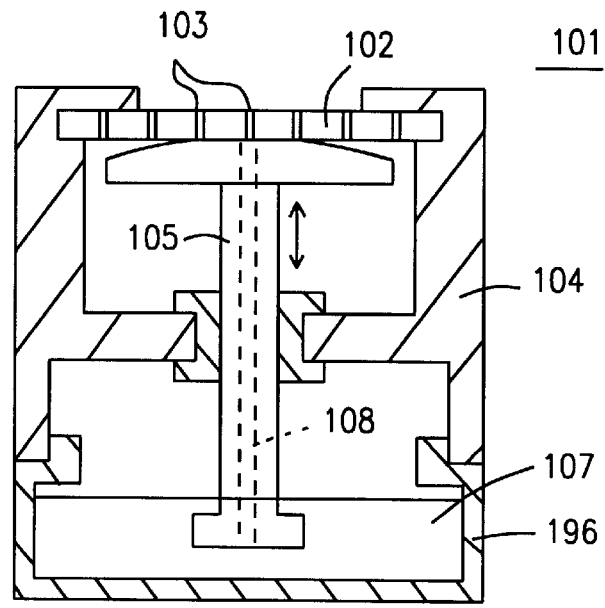
FIG. 26 is a cross section of an inhaler.
Figure 27:
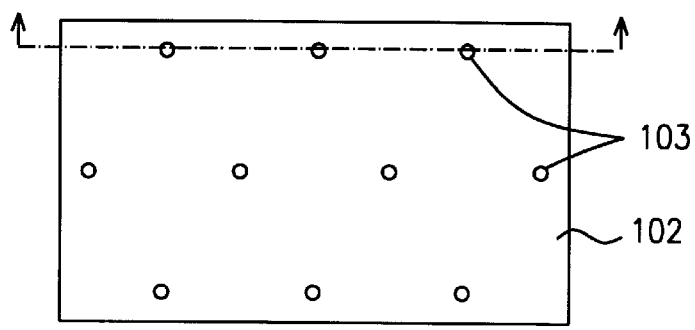
FIG. 27 is an enlarged plan view of a portion of the mesh used in the aforesaid inhaler.
Figure 28:
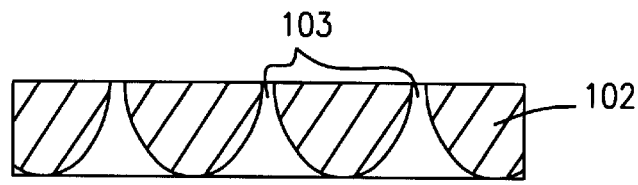
FIG. 28 is a cross section of holes produced by electroforming.
Figure 29:
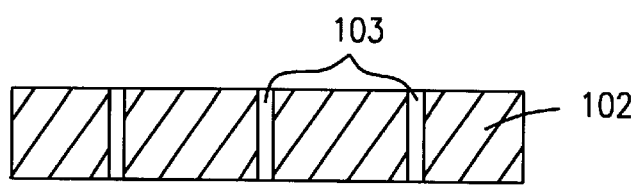
FIG. 29 is a cross section of holes produced by etching or by the electron discharge method.

This method is not limited to the creation of round holes in a regular formation, as shown in FIG. 26. It can also produce an irregular arrangement of holes 6 like that shown in FIG. 5. To achieve this, one could either create a mask 1 with an irregular array of holes, or create holes 6 one at a time in an irregular pattern. Using a mask 1 with an irregular pattern 2 would allow us to produce a mesh 7 with holes of different sizes, as shown in FIG. 5. Oddly shaped holes 6 such as those pictured in FIG. 6 could also be created, either by producing a mask 1 with a pattern 2 of holes shaped like holes 6 in FIG. 6, or by scanning an excimer laser beam L along the edge of each hole 6 in FIG. 6.

Figure 7A:
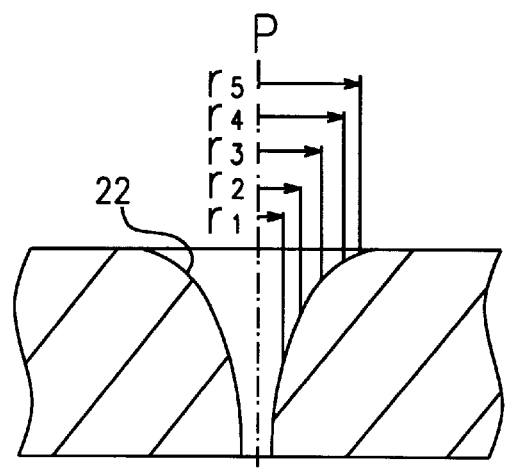
FIGS. 7(a)–7(b) illustrate a method to produce mesh holes using the same device.
Figure 7B:
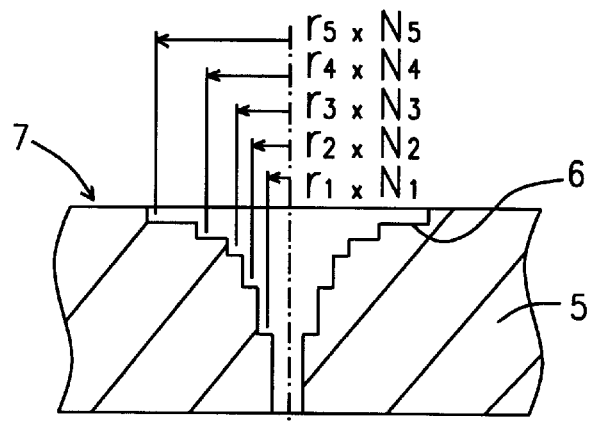
Figure 7C:
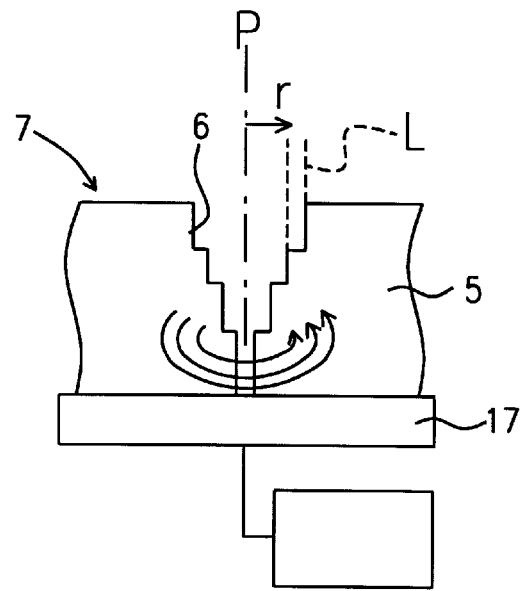
FIG. 7(c) illustrates how the machining is done.

FIGS. 7 (a), 7 (b) and 7 (c) are cross sections of holes which illustrate other examples of methods for producing holes 6 using the device 11 pictured in FIG. 3. FIG. 7 (a) is a cross section of preferred hole 22, the desired outcome. Hole 22 is rotationally symmetric with respect to axis P. Its edge is a smoothly curved surface. This type of symmetric hole 22 can be created by projecting an excimer laser beam L onto material 5 while moving work stage 17 along a path comprising a series of concentric circles. If the machining depth is changed at every radius r, a hole 6 of any desired cross section can be produced. FIG. 7 (c) illustrates this machining process. Excimer laser beam L is moved while it is tracing concentric circles within a single stationary hole 6 to create a circular hole in material 5. By varying the depth to which the material is machined at different radii with respect to axis P, we can obtain a cross section with whatever number of steps we desire. The depth of machining is determined by N, the number of revolutions of work stage 17 while excimer laser beam L is emitted. (If v is the linear velocity in the circumferential direction, the period during which laser beam L is emitted is proportional to N/v. If the work is moved by means of an X-Y stage like stage 17, the linear velocity v in the circumferential direction is fixed irrespective of radius of machining r, so the number of revolutions N corresponds to the period during which laser beam L is emitted.) If instead of the cross section of hole 22 shown in FIG. 7 (a) we wish to produce a hole with a stepping-type cross section as in FIG. 7 (b), the conditions for machining each step are determined by r, the radius with respect to axis P, and N, the number of revolutions of stage 17. We can program the location where the beam will be projected on the topmost step as $r_5$ and the number of revolutions on that step as $N_5$, the location of the second step from the top as $r_4$ and its number of revolutions as $N_4$, the location of the third step from the top as $r_3$ and its number of revolutions as $N_3$ and so on. ($r_5$, $r_4$ and so on are made to differ by varying the diameter of laser beam L.) In this way control device 19 can at once create a number of holes 6 of the appearance shown in FIG. 7 (b). By increasing the number of steps in FIG. 7 (b) and gradually varying radius r, we can make the difference between the steps in the contour of hole 6 very small and produce a hole with an adequately smooth interior surface, so this method could also be used to create the hole 22 pictured in FIG. 7 (a). The number of times laser beam L is emitted will depend on the intensity of the beam. It may be set according to the total dose. When laser beam L is used to perform an ablation process (i.e., a process which relies on an analysis of photoexcitation), the speed of machining (i.e., how deeply the material will be machined with each pulse) can be varied to a certain degree by varying the energy density of the beam. When mesh 7 is turned upside down from the orientation pictured in FIG. 7 (b) so that the narrow ends of holes 6 face outward, it can be used in the type of inhaler 101 pictured in FIG. 26.

Figure 8:
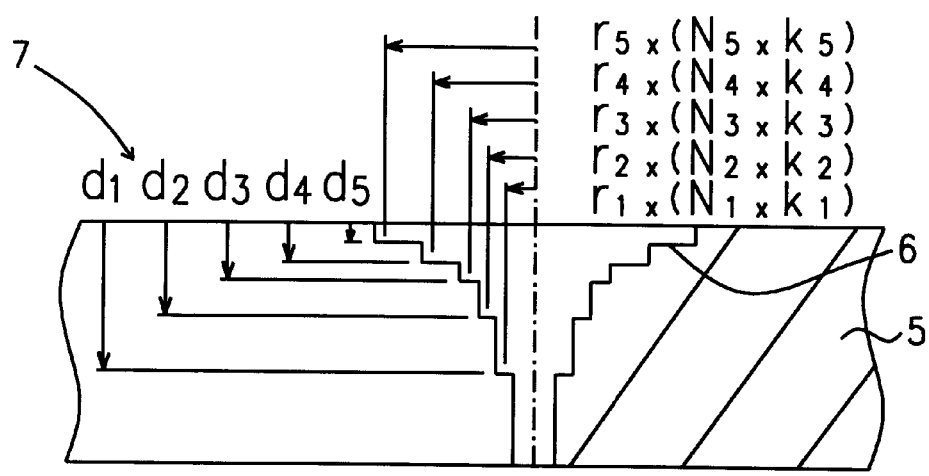
FIG. 8 shows another method for producing a mesh which is an preferred embodiment of this invention.

FIG. 8 shows another method to produce a mesh which is an preferred embodiment of this invention. When excimer laser beam L is scanned over a circular path relative to material 5, the beams L overlap differently on the inner and outer scanning paths. As a result, the effective energy intensity of beam L on the inner paths is greater than that on the outer paths. Since the way the beams overlap varies with the machining radius r, the average effective energy intensity of beam L will vary with machining radius r from the innermost to the outermost path even though the intensity of the beam L projected by laser oscillator 12 does not vary. For this embodiment, if k is the fractional coefficient of beam intensity which is determined by machining radius r (average effective energy intensity/maximal energy intensity of emitted beam), the relationship of machining radius r, number of revolutions N and machining depth d can be expressed as $$d = A(N \times k)$$

where A is a proportional constant. In other words, the radius r from axis P and the number of revolutions N of work stage 17 are programmed such that at beam location r, in the center of the hole, number of revolutions $N_1 = d_1/(Ak_1)$; at beam location $r_2$, the second step from the center, $N_2 = d_2/(Ak_2)$; at beam location $r_3$, the third step from the center, $N_3 = d_3/(Ak_3)$; and so on, where $k_i$ is the fractional density factor of beam intensity which depends on radius $r_i$. In this way control device 19 can at once create a number of holes 6 of the appearance shown in FIG. 8. By using beam intensity coefficient k as described, we can accurately control machining depth d to produce holes 6 with precision contours.

Figure 9:
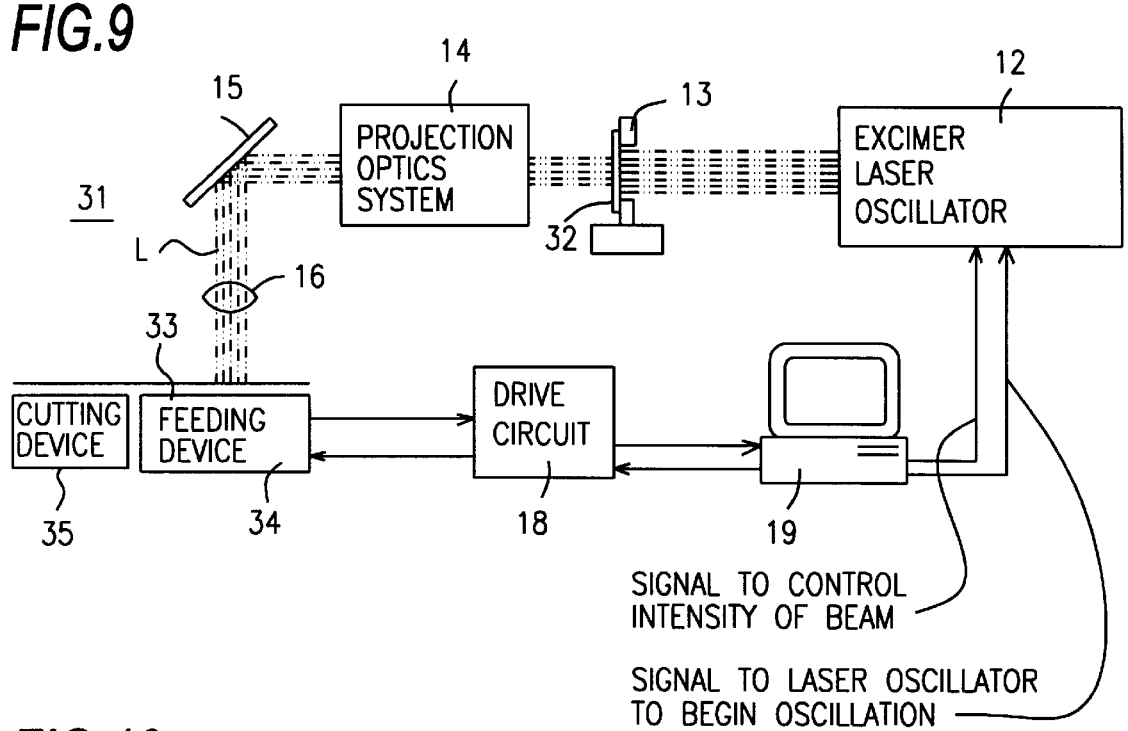
FIG. 9 shows the configuration of a device to produce a thin mesh which is another preferred embodiment of this invention.
Figure 10A:
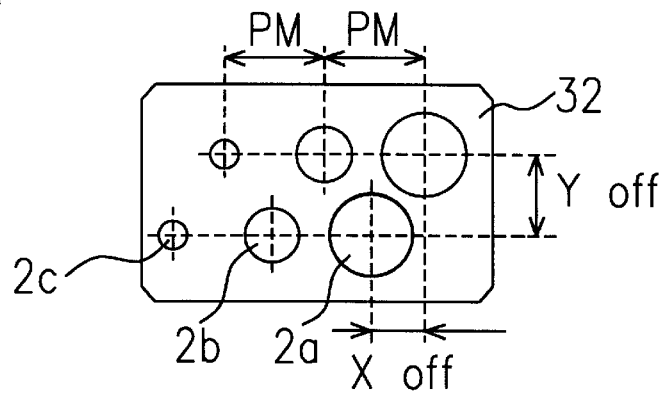
FIGS. 10(a) and 10(b) are plan views of masks used in the same device to produce a thin mesh.
Figure 10B:
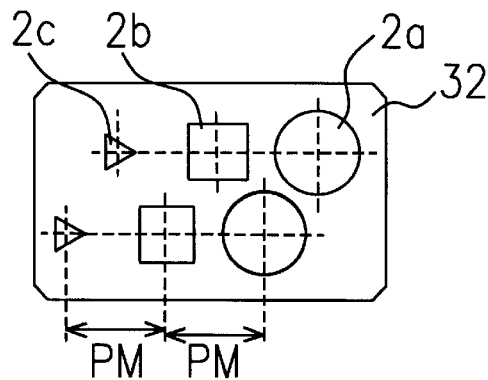

FIG. 9 shows the configuration of device 31, another preferred embodiment of a device to produce a mesh according to this invention. In device 31, 12 is an excimer laser oscillator, 13 is a mask stage to support and adjust the position of mask 32, 14 is a projection optics system, 15 is a totally reflective mirror and 16 is an objective. All of these components have the same configuration and capability as those in device 11 pictured in FIG. 3. Mask 32, which is placed in the aforesaid mask stage 13, has a number of holes 2a, 2b, and so forth, all having the same pitch. The mask 32 shown in FIG. 10 (a), for example, has holes 2a, 2b and 2c arrayed in a single line. Each has a different diameter, but the pitch PM which is a distance from center to center is constant. In FIG. 10 (a), two sets of holes 2a, 2b and 2c are provided which are offset from each other by amounts $X_{off}$ and $Y_{off}$ in directions X and Y. It would also be acceptable to use a single set of holes or three or more sets offset from each other by a certain amount. Another alternative would be to have a pattern of holes 2a, 2b and 2c of different shapes, such as a circle, a square and a triangle, as shown in FIG. 10 (b), formed successively in a single row at a single pitch PM. 34 is a feeding device to move a rolled or long piece of material 33 repeatedly at a fixed pitch, and 35 is a cutting device such as a laser cutter to cut material 33 into fixed lengths or shapes once holes 6 have been formed in it. 18 is a drive circuit to control the rate or the timing at which material 33 is fed. 19 is a control circuit to coordinate drive circuit 18 and laser oscillator 12 so that laser beam L is emitted synchronously with the timing at which material 33 is fed.

Figure 11:
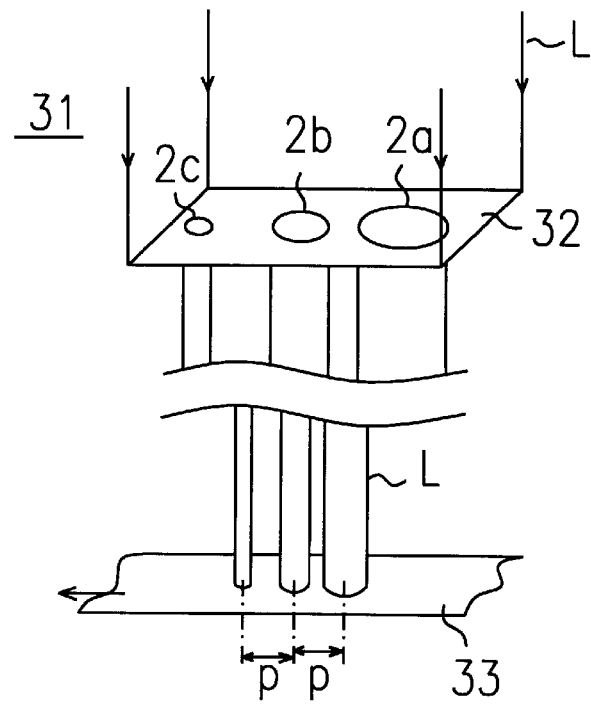
FIG. 11 is a rough perspective drawing of an excimer laser beam from the same device projected onto a piece of thin material.
Figure 12A:
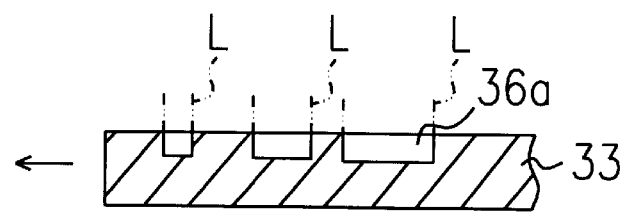
FIGS. 12(a), 12(b), and 12(c) are cross sections illustrating the production method used in the same embodiment.
Figure 12B:
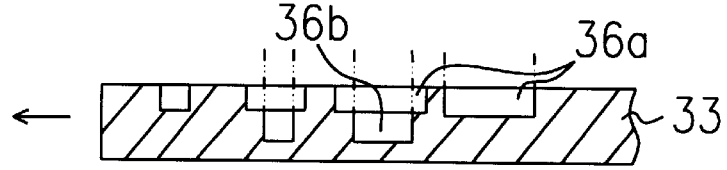
Figure 12C:
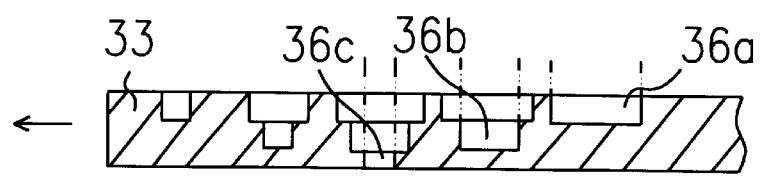
Figure 12D:
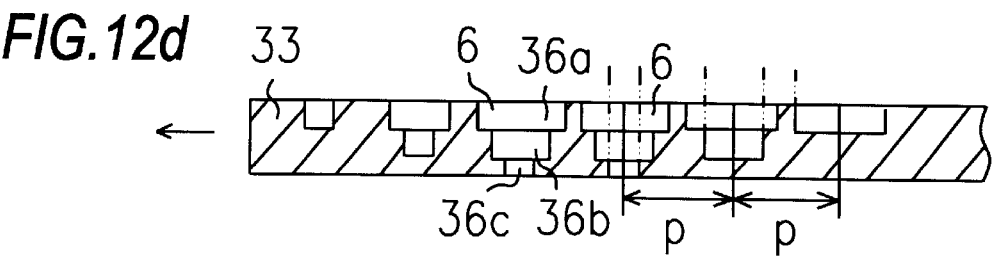
FIG. 12(d) is a cross section of a finished mesh hole.

Excimer laser beam L, which is emitted by laser oscillator 12, passes through holes 2a, 2b and 2c, of various dimensions and shapes, in mask 32, which is fixed in mask stage 13. Laser beam L assumes shapes which are informed by the shapes of the holes in the mask, and these shaped beams strike optical system 14. Shaped beams L travel through optical system 14, are reflected by mirror 15, and pass through objective 16, which reduces them to a given magnification M. A reduced image of the mask pattern is projected onto the rolled piece of material 33 which is seated on feeder device 34, and material 33 is machined. Let us assume that we are using a mask 32 with three holes, 2a, 2b and 2c, of different sizes, as shown in the rough sketch in FIG. 11. If p is the pitch between every two images on material 33, then device 31 would repeatedly execute the process of machining at least a third of the depth of material 33 with a single laser beam and the process of feeding material 33 in increments of pitch p by means of feeder device 34. To give an example, let us assume that material 33 is being fed in the direction indicated by arrows in FIG. 11 and FIGS. 12(a)–12(d). A single hole 6 is produced as follows. First, the laser beam L corresponding to the largest hole in the mask, 2a, creates the largest hole segment in the material, 36a, machining the hole to one third of its eventual depth (FIG. 12 (a)). Material 33 is then fed over a distance equal to p, and the laser beam corresponding to the intermediate hole in the mask, 2b, machines the interior of the largest segment, 36a, excavating the hole to approximately two thirds of its eventual depth to create intermediate segment 36b (FIG. 12 (b)). Material 33 is again fed over a distance equal to p, and the laser beam L corresponding to the smallest hole in the mask, 2c, produces the smallest segment of the hole, 36c, by machining the bottom of intermediate segment 36b all the way through the material (FIG. 12 (c)). When this process is performed repeatedly, numerous holes 6 are created in material 33 at a constant pitch p, as shown in FIG. 12 (d). Once processed, material 33 is transported to cutting device 35, where it is cut to a previously determined shape (e.g., the shape that will allow it to fit in an inhaler) or length, thus completing the manufacture of mesh 7. Once cut, meshes 7 are loaded onto a stacker or some similar device. Alternatively, uncut lengths of material 33 can be wound onto a drum or other receptacle by a winch. In the example we have been discussing, the material is machined starting with the largest hole segment, 36a. It would also be possible to feed material 33 in the opposite direction and machine the hole starting with the smallest segment, 36c.

Figure 13:
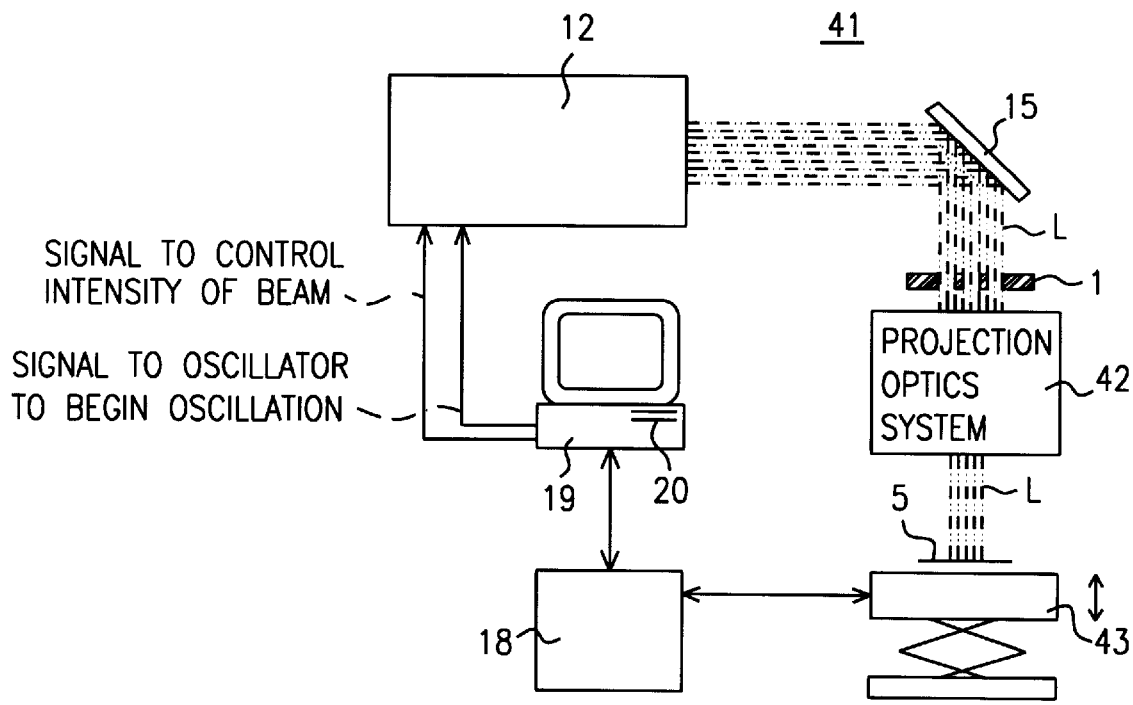
FIG. 13 shows the configuration of a device to produce a mesh which is another preferred embodiment of this invention.

FIG. 13 shows the configuration of device 41, another preferred embodiment of a device to produce a thin mesh according to this invention. In this figure, 12 is an excimer laser oscillator; 15 is a totally reflective mirror; 1 is a mask containing a number of holes 2; 42 is a projection optics system; and 43 is a work stage such as a Z-stage. The excimer laser beam L emitted by laser oscillator 12 passes through holes 2 in mask 1, which shape it into beams having the same form as those holes. The path of these laser beams is changed by totally reflective mirror 15, and they are made to strike projection optics system 42. The projected image of the mask pattern, reduced as desired by optical system 42, is projected on material 5, which is seated on work stage 43, and the material is machined to produce holes 6.

Figure 14:
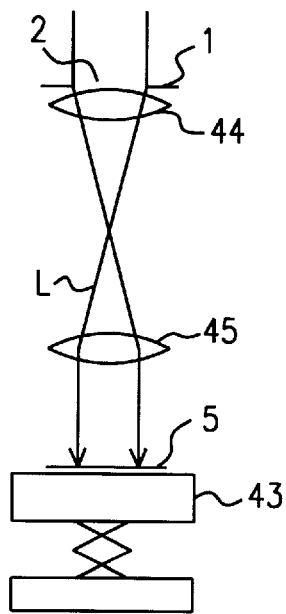
FIG. 14 shows an example of a projection optics system which could be used in the same device.

The aforesaid projection optics system 42 can vertically project the image of pattern 2 onto the surface of material 5, and is capable of changing the magnification of the image. A telecentric optical system could be used for this purpose. FIG. 14 shows how a projection optics system 42 like the one we have been discussing might be designed. Convex lens 44 is placed in the optical path of laser beam L directly behind mask 1. Imaging lens 45 is placed on the optical axis of the beam between lens 44 and work stage 43. This constitutes what is known as a telecentric optical system. One characteristic of this optical system is that when it is defocused the center of the image and the periphery both undergo the same degree of distortion. For this reason the entire work surface can be defocused homogeneously. In the device 41 pictured in FIG. 13, mirror 15 is placed above mask 1. However, it would be equally acceptable to place lens 44 of optical system 42 and mask 1 on a horizontal optical path and position mirror 15 between lenses 44 and 45.

The excimer laser beam L pictured in FIG. 13 is projected vertically toward work stage 43. Stage 43 can go up and down, which means that it moves parallel to the optical path of laser beam L. The stage is controlled by device 19 and drive circuit 18. Control device 19 contains device 20, which stores the drive path for the work stage. It raises and lowers stage 43 according to a previously recorded program to control the degree to which the projected image is defocused, and it synchronously controls the oscillation of laser oscillator 12.

Figure 15A:
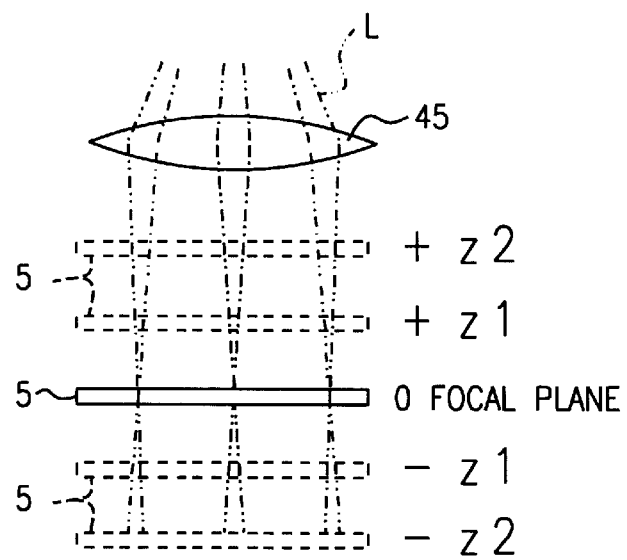
FIGS. 15(a) and 15(b) show the relationship between the position (the degree of defocus) of the image and its dimensions in the same device to produce a mesh.
Figure 15B:
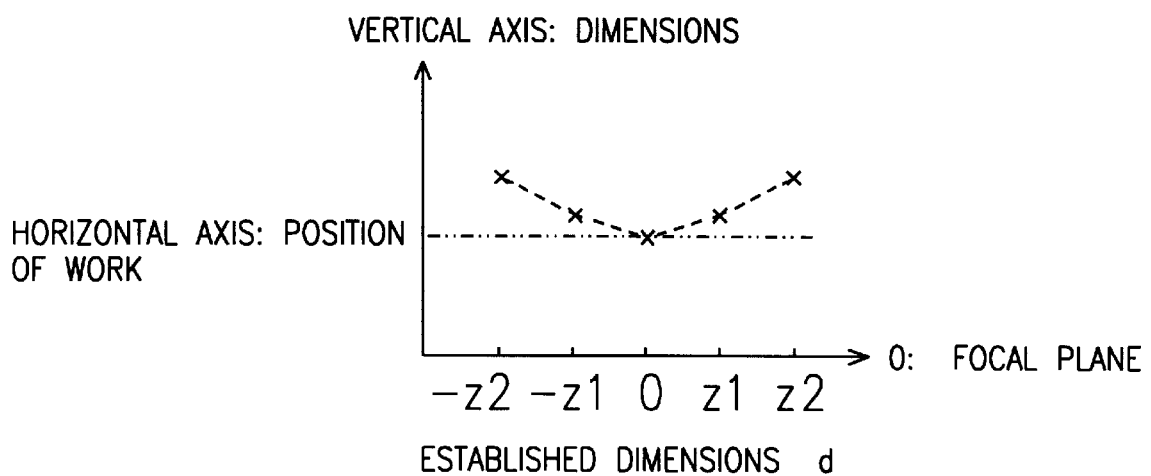

With this type of device 41, then, the diameter of hole 6 is set to d on the imaging plane (where the degree of defocus is 0). When work stage 43 is driven the position of material 5, as shown in FIG. 15(a), is changed. When the processing is done on a plane which is a distance of $\pm z_1$ from the focal plane, the image will be enlarged and the dimensions of the holes will be increased. At a distance of $\pm z_2$ (where $z_2 > z_1$), the image will be even larger and the dimensions even further increased. By carefully investigating this correspondence in a quantitative fashion, we can discover what dimensions will be produced at each degree of defocus, and we can obtain the relationship between the position of the work (or the degree of defocus) and the dimensions of the pattern (or the degree of distortion). An example of such a relationship is given in FIG. 15 (b).

Figure 16A:
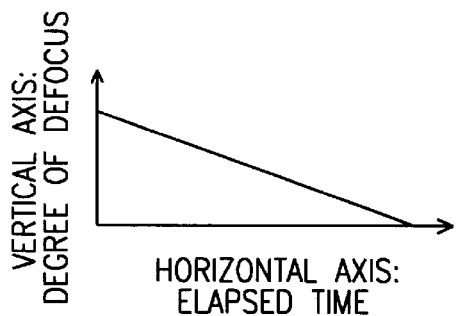
FIG. 16(a) shows one way in which the degree of defocus can be varied over time.
Figure 16B:
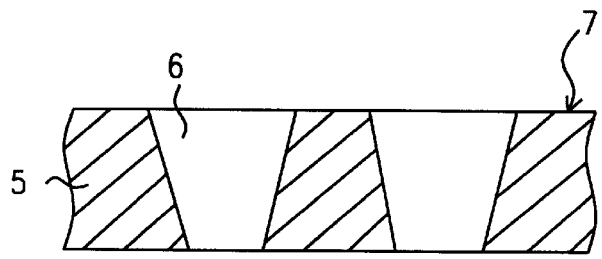
FIG. 16(b) is a cross section of holes produced by varying the defocus as shown in FIG. 16(a).
Figure 17A:
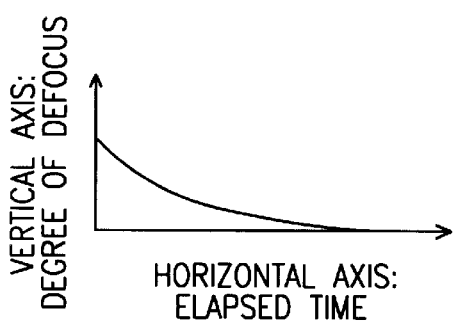
FIG. 17(a) shows another way in which the degree of defocus can be varied over time.
Figure 17B:
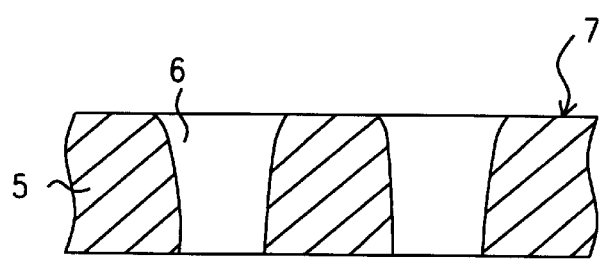
FIG. 17(b) is a cross section of holes produced by varying the defocus as shown in FIG. 17(a).
Figure 18A:
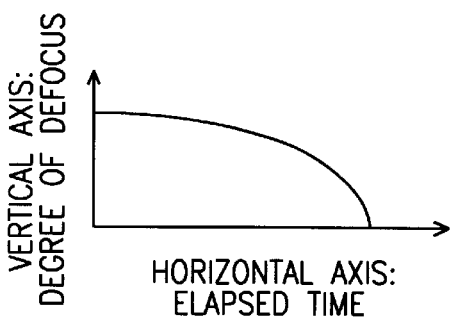
FIG. 18(a) shows yet another way in which the degree of defocus can be varied over time.
Figure 18B:
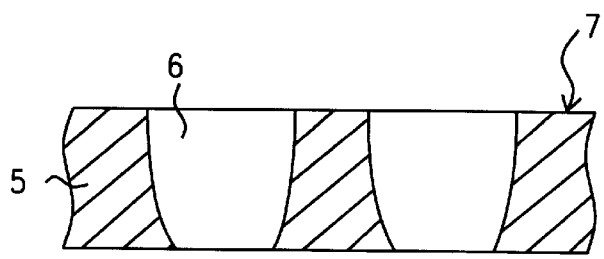
FIG. 18(b) is a cross section of holes produced by varying the defocus as shown in FIG. 18(a).

With a device 41 configured as described above, we can control work stage 43 so that the degree to which the image is defocused varies over time, as shown in FIG. 16 (a). This would produce a smoothly tapered hole 6 as shown in FIG. 16 (b). If stage 43 is controlled so that the degree of defocus varies as shown in FIG. 17 (a), the resulting hole 6 will be shaped like a top, as shown in FIG. 17 (b). And if stage 43 is controlled so that the degree of defocus varies as shown in FIG. 18 (a), the barrel-shaped hole 6 shown in FIG. 18 (b) will be produced.

FIG. 19 illustrates the configuration of device 51, yet another preferred embodiment of a device to produce a thin mesh according to this invention. In this figure, 12 is an excimer laser oscillator; 52 is a drive device which supports mask 53, adjusts its position, and drives it; 14 is a projection optics system; 15 is a totally reflective mirror; 16 is an objective to produce the image of pattern 58 on the surface of thin material 5; 17 is a work stage to move material 5, which is seated upon it, relative to excimer laser beam L; 18 is a drive circuit to control the position of stage 17 and, through drive device 52, the amount of drive applied to mask 53; and 19 is a device to control the drive. Control device 19 contains device 20, which controls stage 17 and drive device 52 according to a previously programmed pattern and, at the same time, synchronously controls the oscillation of laser oscillator 12.

FIG. 20 shows plan views of the aforesaid mask 53. Mask 53 consists of two submasks, 54 and 55, which are put together one on top of the other. Both of the submasks have numerous holes 56 and 57 of the same shape and in the same arrangement. Mask holes 58 consist of the region which remains open when holes 56 in submask 54 and holes 57 in submask 55 are made to overlap. If submasks 54 and 55 are stacked so that their holes coincide perfectly, the resulting holes 58 will be 100% open. If submasks 54 and 55 are realigned so that the holes are offset with respect to each other, various sizes of holes will result. If holes 56 and 57 are completely covered, as shown in FIG. 21 (a), holes 58 will be 0% open. If holes 56 and 57 overlap slightly, as shown in FIG. 21 (b), holes 58 will be slightly open. If holes 56 and 57 are made to overlap more, as shown in FIG. 21 (c), holes 58 will be relatively larger. In this way the size of holes 58 can be adjusted as desired. In FIG. 20 and FIGS. 21(a)–21(c), holes 56 and 57 are square or diamond-shaped; however, this shape is not an essential requirement. Holes which are triangular, hexagonal, or of any other shape may also be used. With the square or diamond-shaped holes shown in the drawings, holes 58 remain the same shape when their dimensions change.

Figure 22:
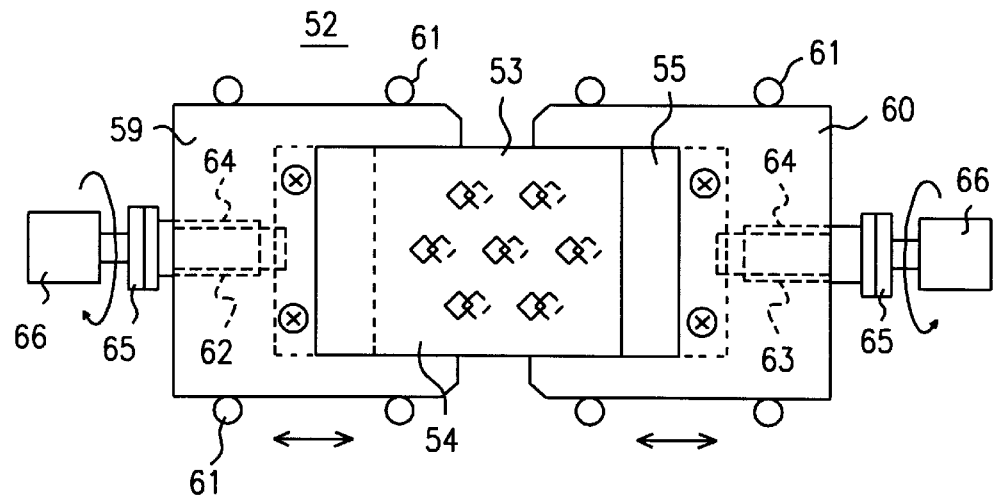
FIG. 22 is a front view of the device to drive the mask which is used in the same device to produce a mesh.
Figure 23A:
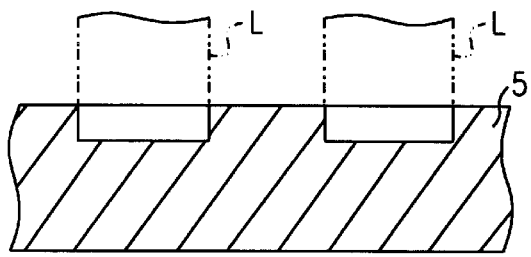
FIGS. 23(a), 23(b), 23(c), and 23(d) are cross sections to illustrate the order in which the holes are machined by the same device to produce a mesh.
Figure 23C:
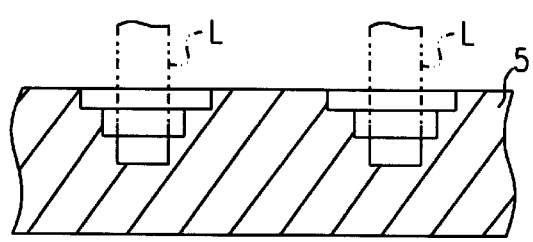
Figure 23B:
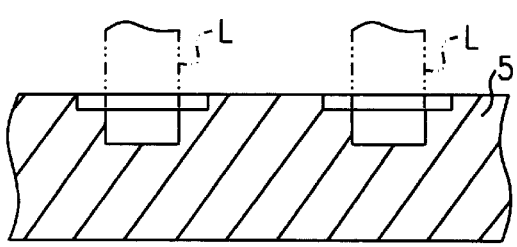
Figure 23D:
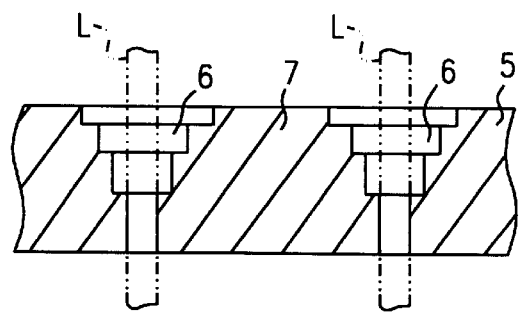
Figure 24A:
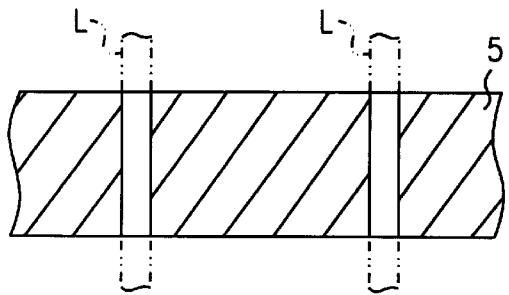
FIGS. 24(a), 24(b), 24(c), and 24(d) are cross sections illustrating a different order in which the holes may be machined by the same device to produce a mesh.
Figure 24B:
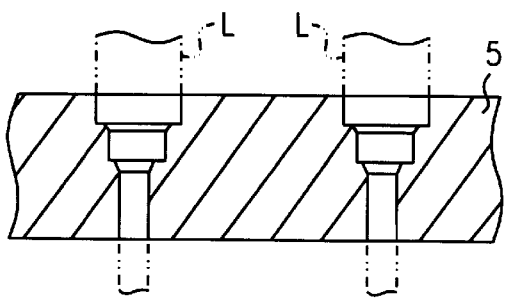
Figure 24C:
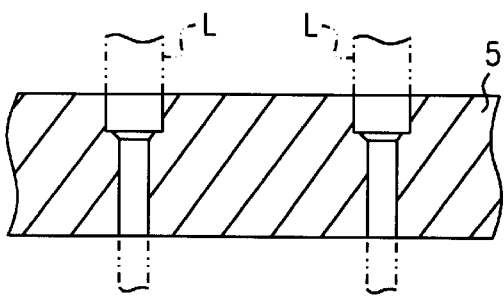
Figure 24D:
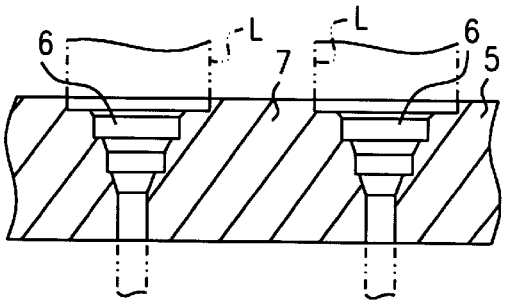

FIG. 22 shows a front elevation view of drive device 52, the device which drives the aforesaid mask 53 to change the aperture of holes 58. Submasks 54 and 55 are retained by holders 59 and 60 to the left and right. Holders 59 and 60 are supported by mechanism 61, consisting of linear bearings or the like, in such a way that they can move smoothly parallel to each other. Holders 59 and 60 have precision feed screws 64, which engage in screw holes 62 and 63. Screws 64 are connected to pulse stepping motors 66 through couplings 65. In drive device 52, stepping motors 66 are controlled to the same phase, so that submasks 54 and 55 are moved over the same distance in opposite directions. Consequently, since holes 56 and 57 in submasks 54 and 55 move symmetrically relative to each other, the centers of holes 58 do not move. Thus the optical axis of each excimer laser beam L which passes through a hole 58 remains fixed.

With a device 51 like that described above, we can machine mesh holes 6 whose diameter varies with their depth, as shown in FIGS. 23(a)–23(d). First, the aperture of holes 58 is set at 100% so that a large area of material 5 is machined to an appropriate depth, as shown in FIG. 23 (a). The aperture of the holes in mask 53 is then constricted slightly by driving device 52, and a slightly smaller area of material 5 is machined to an appropriate depth, as shown in FIG. 23 (b). The aperture is again constricted in the same way, and an even smaller area is removed, as shown in FIG. 23 (c). Finally, the aperture as further constricted, and a hole of even smaller diameter is bored completely through material 5, as shown in FIG. 23 (d). In this way numerous through holes 6 can be formed.

The order of the machining processes used to create hole 6 in FIG. 23 could also be reversed. In this case, the size of the segments to be removed by machining would be systematically increased. The diameter of hole 6 would be increased methodically as shown in FIGS. 24 (a), 24 (b), 24 (c) and 24 (d) (Note: FIGS. 24 (b) and 24 (c) have been exchanged in the drawing.) to produce a hole 6 of the intended shape. If the first narrow segment which is machined is made to taper automatically, the result would be a smooth, gradual change of diameter, as can be surmised from FIGS. 24(a)–(d). In FIGS. 23(a)–23(d) and FIGS. 24(a)–24(d), the size of hole 53 is increased in four steps; however, the size of the holes comprising pattern 58 in mask 53 might, for example, be increased with every shot of excimer laser beam L. In this case, the machining could be controlled more precisely, and the resulting holes 6 would have smooth sides. It is not essential that mask 53 be driven discontinuously over time. Driving it continuously will create a hole 6 with a smooth cross section. It would also be possible to adjust mask 53 manually without using drive device 52.

Figure 25:
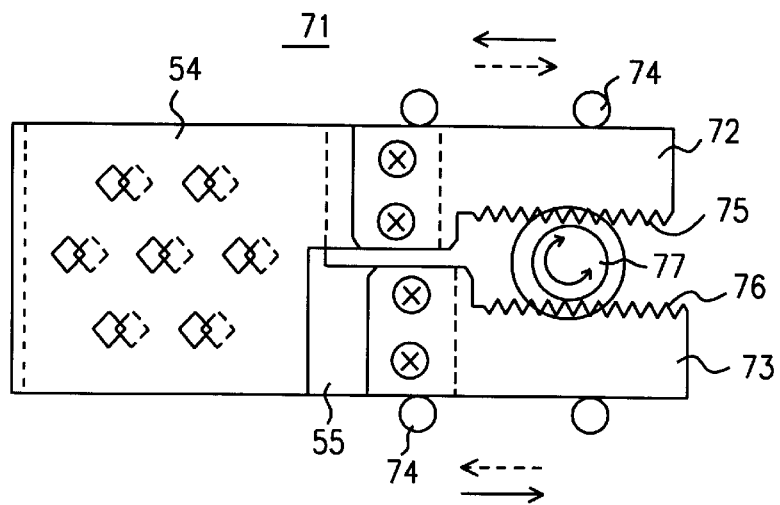
FIG. 25 is a front view of another device to drive a mask which may be used in the device to produce a mesh shown in FIG. 19.

FIG. 25 is a front elevation view of drive device 71, another device which can be used to drive the mask in device 51. Drive device 71 has two holders, 72 and 73, one of which is atop the other on the same side of the mask. To each of these holders is affixed one side of one of submasks 54 and 55. Holders 72 and 73 are supported by mechanism 74, consisting of linear bearings or the like, in such a way that they can move horizontally. On the lower surface of upper holder 72 and the upper surface of lower holder 73 are racks 75 and 76, both with the same pitch. These racks oppose each other vertically. Drive fear 77, which is driven to rotate by a motor (not pictured), engages simultaneously with both racks. When gear 77 is rotated, submasks 54 and 55 are moved horizontally in opposite directions over the same distance, and holes 58, which consist of the spaces formed by the intersection of holes 56 in submask 54 with holes 57 in submask 55, grow bigger or smaller.

When the mesh produced according to this invention is made from a material which is safe for human beings, such as polysulfone or polyester, it can be used in medical equipment like the inhaler pictured in FIG. 26. With an inhaler, the distance which the drug must be transported to reach the affected area differs, so the effectiveness varies with the diameter of the spray particles. This diameter is highly dependent on the shape of the holes in the mesh. This invention allows us to achieve holes with preferred cross section for spraying. Furthermore, the shape of the holes in the mesh can be changed as needed for different affected areas while the frequency of the oscillator remains constant. If we change the mesh, then, we can use the same inhaler to deliver a drug to a number of affected areas. A mesh produced from a material such as polyamide can be used in equipment for a physics or chemistry lab.

In the embodiments discussed above, an excimer laser oscillator is used as the light source. It would also be possible to use the fourth high frequency of a YAG laser, a parametric oscillator, or an ultraviolet (UV) beam.

The device described above is not limited to the machining of thin materials composed of polymers. It could also be used to produce a mesh from a foil of some metal other than nickel, such as titanium or stainless steel, which are not harmful to humans. The resulting product could also be used as a thin mesh. A mesh could also be produced from a ceramic material, and the resulting product could be used as a thin mesh.

Applications In Industry

This invention allows us to choose the material to be used to produce a thin mesh. Having a choice of materials allows us to achieve a flexible mesh of a material with superior resistance to corrosion and chemicals, such as a polymer or ceramic. The preferred material can be selected for the intended application of the mesh. A thin mesh produced from a material such as polysulfone or polyester, which are safe for humans and highly resistant to corrosion, is preferred for use in medical devices such as inhalers or in food production equipment. A mesh made of polyamide would be suitable for use in equipment designed for physics and chemistry labs. Many other applications will doubtless be found for such meshes.

With this invention, microscopic through holes are created by an ultraviolet beam. This allows a microscopic machining process to be performed on the material of one's choice. Through holes can be machined to any desired shape and cross-sectional contour, using either step-by-step or smooth tapering.

A method to produce through holes which entails moving an ultraviolet beam and a piece of thin material relative to each other allows us to produce holes of the desired shape irrespective of the shape of the mask. This eliminates the time required to change the mask in prior art methods. If a number of ultraviolet beams are used, a number of through holes can be created at the same time, resulting in a shorter processing time. This also facilitates automation of the mesh production process.

Another method employs a mask with a pattern containing a number of holes of different shapes and diameters. The shape of the through holes is changed at different depths of machining. This method allows us to create in the thin material microscopic mesh holes consisting of many steps whose machining can be precisely controlled, and it can produce through holes with whatever cross section we might desire. In particular, if the pattern in the mask consists of numerous holes of different shapes or diameters but at a fixed pitch, we can create a number of holes at the same time. This reduces the processing time and improves efficiency. If a rolled or other long piece of material is cut into pieces after the mesh is created, efficiency is further enhanced.

A method by which the focal plane of an ultraviolet beam and a piece of thin material move relative to each other parallel to the optical axis of the beam allows us to vary the distance between the focal plane and the material continuously over time. In this way we can vary the diameter of the hole continuously and smoothly by varying the depth of machining. We can easily produce through holes with a smoothly tapering inner surface.

If we change the dimensions of the holes in the mask by driving the two halves of it, we can achieve holes of various sizes in the same mask and create through holes of various dimensions without changing the mask or adjusting the optical system. By varying the dimensions of the mask holes while the through holes are being machined, we can cause the diameter of each hole to vary. This produces through holes whose diameter varies with their depth, either continuously or discontinuously, and whose cross sections have a desired shape.

We claim:

1. A method of producing a thin mesh, comprising the steps of:

(a) irradiating a thin material, through a mask, with a plurality of laser beams, said laser beams being of sufficiently small respective diameters to produce through holes in the thin material; and (b) moving the thin material along two dimensions relative to the laser beams, concurrent with step (a), in order to simultaneously create a plurality of through holes of a desired shape in the thin material, wherein the desired shape is produced by focussing and defocusing of said plurality of laser beams.

2. The method of producing a thin mesh according to claim 1, wherein step (b) comprises the step of moving the thin material relative to the the laser beams in order to simultaneously create the plurality of through holes in the thin material such that each hole of the plurality of through holes is created to have one of a varying hole width and a varying hole depth.

3. The method of producing a thin mesh according to claim 2, wherein each hole of the plurality of through holes is created to be rotationally symmetric with a smoothly curved surface.

4. The method of producing a thin mesh according to claim 2, wherein each hole of the plurality of through holes is created to be rotationally symmetric with a step-type cross section.

5. The method of producing a thin mesh according to claim 1, wherein step (b) comprises the step of moving the thin material and the laser beams relative to each other in a plurality of circular paths which overlap each other with respect to the respective diameters of the laser beams.

6. An apparatus for producing a thin mesh, comprising:

a mask having a first plurality of through holes;

an emitting device which emits, through the mask, a plurality of laser beams corresponding to the first plurality of through holes, said laser beams being of a sufficiently small respective diameters to produce through holes in a thin material;

a translator device which moves the thin material relative to the laser beams, while the emitting device is emitting the plurality of laser beams, in order to simultaneously create a second plurality of through holes of a desired shape in the thin material; and a control device which moves said translator device to focus and defocus said plurality of laser beams to produce the desired shape.

7. The apparatus for producing a thin mesh according to claim 6, further comprising:

a storage device which stores information representing the desired shape; and a control device which reads the information representing the desired shape from the storage device and provides a first control signal to the translator device according to the desired shape and provides a second control signal to the emitting device to control an intensity and oscillation of the laser beams.

8. A method of producing a thin mesh comprising the steps of:

(a) providing a mask having a first plurality of through holes aligned sequentially along a line;

(b) irradiating a thin material, through the mask, with a plurality of laser beams, said plurality of laser beams corresponding to the first plurality of through holes in the mask, said laser beams being of sufficiently small respective diameters to produce a set of through holes in the thin material;

(c) advancing the thin material in a direction parallel to the line; and (d) repeating steps (b)–(c) to produce another set of through holes in the thin material, wherein at least one through hole of the first plurality of through holes in the mask has a different shape with respect to another through hole of the first plurality of through holes.

9. The method of producing a thin mesh according to claim 8, wherein each of the first plurality of through holes is circular and at least one through hole of the first plurality of through holes in the mask has a different diameter with respect to another through hole of the first plurality of through holes.

10. The method of producing a thin mesh according to claim 8, wherein, in step (a), each of the first plurality of through holes in the mask is arranged sequentially along the line with a pitch, and wherein, in step (c), the thin material is advanced a distance equal to the pitch.

11. The method of producing a thin mesh according to claim 10, wherein step (b) takes place for a first period of time, step (c) takes place for a second period of time, and step (b) and step (c) are synchronized such that the thin material is not irradiated while the thin material is being advanced.

12. The method of producing a thin mesh according to claim 23, further comprising the step of:

(e) cutting the thin material after step (d).

13. An apparatus for producing a thin mesh, comprising:

a mask having a plurality of through holes aligned sequentially along a line;

an emitting device for irradiating a thin material, through the mask, with a plurality of laser beams, said plurality of laser beams corresponding to the plurality of through holes in the mask, said laser beams being of sufficiently small respective diameters to produce through holes in the thin material; and a feeding device for advancing the thin material in a direction parallel to the line, wherein at least one through hole of the plurality of through holes in the mask has a different shape with respect to another through hole of the plurality of through holes in the mask.

14. The apparatus for producing a thin mesh according to claim 13, wherein each of the plurality of through holes is circular and at least one through hole of the plurality of through holes in the mask has a different diameter with respect to another through hole of the plurality of through holes in the mask.

15. The apparatus for producing a thin mesh according to claim 13, wherein each of the plurality of through holes in the mask is arranged sequentially along the line with a pitch, and wherein the feeding devices advances the thin material a distance equal to the pitch.

16. The apparatus for producing a thin mesh according to claim 15, further comprising a control circuit for coordinating timing of irradiating by the emitting device and advancing by the feeding device, such that the thin material is not irradiated while the thin material is being advanced.

17. The apparatus for producing a thin mesh according to claim 13, further comprising a cutting device for cutting the thin material into a predetermined shape.

18. A method of producing a thin mesh, comprising the steps of:

(a) irradiating a thin material, through a mask having a first plurality of through holes, with a plurality of laser beams, said plurality of laser beams corresponding to the first plurality of holes and being of a sufficiently small respective diameter to produce through holes in the thin material; and (b) varying a magnification and a focus of the laser beams over time with respect to the thin material, concurrent with step (a), in order to simultaneously create a second plurality of through holes of a desired shape in the thin material, wherein the desired shape is correlated to a degree of defocusing of the laser beams.

19. The method of producing a thin mesh according to claim 18, wherein, in step (b), the focus is varied by moving the thin material towards and away from the laser beams.

20. The method of producing a thin mesh according to claim 18, wherein step (b) comprises the step of varying the focus of the laser beams such that each hole of the second plurality of through holes is created to have a varying hole width.

21. The method of producing a thin mesh according to claim 20, wherein each hole of the second plurality of through holes is created to be rotationally symmetric with a smoothly curved surface.

22. The method of producing a thin mesh according to claim 20, wherein each hole of the second plurality of through holes is created to be rotationally symmetric with a step-type cross section.

23. An apparatus for producing a thin mesh comprising:
a mask having a first plurality of through holes;
an emitting device which emits a plurality of laser beams, through said mask, said plurality of laser beams corresponding to the first plurality of through holes and being of sufficiently small respective diameters to produce through holes in a thin material; and
an optical system which varies a magnification and a focus of the laser beams over time with respect to the thin material, while the emitting device is emitting a plurality of laser beams, in order to simultaneously create a second plurality of through holes of a desired shape in the thin material, the desired shape being correlated to a degree of defocusing of the laser beams.

24. The apparatus for producing a thin mesh according to claim 23, wherein the optical system comprises a projection system which varies the magnification of the laser beams.

25. The apparatus for producing a thin mesh according to claim 23, wherein the optical system comprises a staging device which moves the thin material towards and away from the laser beams to vary the focus.

26. The apparatus according to claim 23, further comprising:
a storage device which stores information representing the desired shape; and
a control device which reads the information representing the desired shape from the storage device and provides a first control signal to the optical system according to the desired shape and provides a second control signal to the emitting device to control an intensity and oscillation of the laser beams.

27. A method of producing a thin mesh comprising the steps of:
(a) providing a first submask having a first plurality of through holes;
(b) providing a second submask having a second plurality of through holes;
(c) forming a mask by overlaying the first submask on the second submask such that the first plurality of through holes overlaps the second plurality of through holes;
(d) varying a position of the first submask with respect to the second submask to form a third plurality of through holes of a desired shape for the mask; and (e) irradiating a thin material, through the mask, with a plurality of laser beams, said plurality of laser beams corresponding to the third plurality of through holes in the mask, said laser beams being of sufficiently small respective diameters to produce a fourth plurality of through holes in the thin material.

28. The method of producing a thin mesh according to claim 27, wherein step (d) occurs concurrently with step (e) in order to vary a dimension of the third plurality of through holes in the mask and thereby simultaneously create the fourth plurality of through holes in the thin material such that each hole of the fourth plurality of through holes has a varying hole width.

29. The method of producing a thin mesh according to claim 28, wherein each hole of the fourth plurality of through holes is created to have a step-type cross section.

30. The method of producing a thin mesh according to claim 28, wherein each hole of the fourth plurality of through holes is created to be smoothly tapered.

31. An apparatus for producing a thin mesh, comprising:
a mask comprising:
a first submask having a first plurality of through holes;
a second submask having a second plurality of through holes, wherein the first submask is overlaid on the second submask such that the first plurality of through holes overlaps the second plurality of through holes to form a third plurality of through holes for the mask;
a drive device for adjusting a position of the first submask with respect to the second submask in order to vary a dimension of the third plurality of through holes by varying an amount of overlap between the first plurality of through holes and the second plurality of through holes; and
an emitting device which emits, through the mask, a plurality of laser beams, said laser beams being of sufficiently small respective diameters to produce a fourth plurality of through holes in a thin material.

32. The apparatus for producing a thin mesh according to claim 31, wherein the drive device adjusts the position of the first submask concurrently with the emitting device emitting the laser beams in order to simultaneously create the fourth plurality of through holes in the thin material such that each hole of the fourth plurality of through holes has a varying hole width.

33. The apparatus for producing a thin mesh according to claim 32, wherein each hole of the fourth plurality of through holes is created to be smoothly tapered.

34. The apparatus for producing a thin mesh according to claim 32, wherein each hole of the fourth plurality of through holes is created to have a step-type cross section.

35. The apparatus for producing a thin mesh according to claim 31, wherein the drive device comprises:
a first holder for holding the first submask;
a second holder for holding the second submask;
a motor device coupled to each of the first and second holders for adjusting the relative positions thereof.

36. The apparatus for producing a thin mesh according to claim 35, wherein the motor device comprises:
a first stepping motor coupled to the first holder; and
a second stepping motor coupled to the second holder, wherein
the first and second stepping motors are controlled to move the first and second submasks a same distance in opposite directions to maintain an optical axis of each of the laser beams in a fixed position.

37. The apparatus for producing a thin mesh according to claim 35, wherein the first holder comprises a first rack and the second holder comprises a second rack, the second rack being vertically opposed to the first rack, and wherein the motor device comprises a drive gear driven by a motor, the drive gear simultaneously engaging the first and second racks to move the first and second submasks a same distance in opposite directions to maintain an optical axis of each of the laser beams in a fixed position.

38. The apparatus for producing a thin mesh according to claim 31, further comprising:
   a storage device which stores information representing a desired shape; and
   a control device which reads the information representing the desired shape from the storage device and provides a first control signal to the drive device according to the desired shape and provides a second control signal to the emitting device to control an intensity and oscillation of the laser beams.

39. A method of producing a thin mesh comprising the steps of:
   (a) providing a mask having a plurality of mask through holes aligned sequentially along a line, wherein said plurality of mask through holes includes a first mask through hole adjacent to a second mask through hole, and wherein the first mask though hole has a different cross-section from the second mask through hole and is separated from the second through hole by a pitch distance;
   (b) irradiating a thin material, through the mask, with a plurality of laser beams, said plurality of laser beams corresponding to the plurality of mask through holes, said laser beams being of sufficiently small respective diameters to produce a set of work through holes in the thin material, wherein one of the set of work through holes in the thin material is irradiated through the first mask through hole;
   (c) advancing the thin material in a direction parallel to the line by the pitch distance; and
   (d) irradiating the thin material, through the mask, with the plurality of laser beams, so that the one of the set of work through holes in the thin material is irradiated through the second mask through hole, and, is thereby further excavated to form a stepped profile.

* * * * *